United States Patent
Barrett et al.

(10) Patent No.: US 10,032,045 B2
(45) Date of Patent: Jul. 24, 2018

(54) DYNAMIC RUNTIME FIELD-LEVEL ACCESS CONTROL USING A HIERARCHICAL PERMISSION CONTEXT STRUCTURE

(71) Applicant: Raytheon Company, Waltham, MA (US)

(72) Inventors: Nicholas Wayne Barrett, Oro Valley, AZ (US); Aaron M. Kovell, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 173 days.

(21) Appl. No.: 14/928,585

(22) Filed: Oct. 30, 2015

(65) Prior Publication Data

US 2017/0126681 A1    May 4, 2017

(51) Int. Cl.
*G06F 21/62* (2013.01)
*H04L 29/06* (2006.01)
(Continued)

(52) U.S. Cl.
CPC ........ *G06F 21/6245* (2013.01); *H04L 9/0836* (2013.01); *H04L 63/08* (2013.01);
(Continued)

(58) Field of Classification Search
CPC ..... H04L 63/10; H04L 64/064; H04L 63/083; H04L 63/102; H04L 63/08; H04L 9/0836;
(Continued)

(56) References Cited

U.S. PATENT DOCUMENTS 6,981,141 B1 * 12/2005 Mahne .................... G06F 21/80
713/165
7,058,648 B1    6/2006 Lightfoot
(Continued)

OTHER PUBLICATIONS

"Field level security", Dynamics CRM 2015, [Online]. Retrieved from the Internet: <URL: https://technet.microsoft.com/en-us/library/dn832104.aspx, (Accessed May 8, 2015), 3 pgs.

*Primary Examiner* — Joseph P Hirl
*Assistant Examiner* — Stephen Gundry
(74) *Attorney, Agent, or Firm* — Schwegman Lundberg & Woessner, P.A.

(57) ABSTRACT

This disclosure provides for a system, method, and machine-readable medium for performing dynamic runtime field-level access control using a hierarchical permission context structure. The hierarchical permission context structure includes various levels of roles, where each role is assigned one or more permissions. The one or more permissions assigned to the one or more roles indicate the amount of control a given user has over data displayable in an electronic document. The electronic document includes one or more fields having corresponding records in one or more databases. A record includes metadata about the data for a corresponding field. When an electronic document is requested, the fields of the electronic document are generated from the data stored in their corresponding records. An evaluation is performed that determines whether the user requesting the electronic document is authorized to view the data for one or more of the fields based on their corresponding metadata.

17 Claims, 12 Drawing Sheets

(51) Int. Cl.
*G06F 21/60* (2013.01)
*H04L 9/08* (2006.01)

(52) U.S. Cl.
CPC .......... H04L 63/102 (2013.01); *G06F 21/602* (2013.01); *H04L 9/0816* (2013.01); *H04L 2209/24* (2013.01)

(58) Field of Classification Search
CPC ............... H04L 2209/24; H04L 9/0816; G06F 21/6245; G06F 21/602
See application file for complete search history.

(56) References Cited

U.S. PATENT DOCUMENTS

| | | | |
|---|---|---|---|
| 7,103,915 B2 | 9/2006 | Redlich et al. | |
| 7,937,663 B2 | 5/2011 | Parker | |
| 8,812,961 B2 | 8/2014 | Srinivasaraghavan et al. | |
| 8,850,227 B1* | 9/2014 | Krahn | G06F 21/57 380/277 |
| 8,886,672 B2 | 11/2014 | Chaurasia et al. | |
| 8,972,421 B2 | 3/2015 | Vishnubhatta et al. | |
| 9,015,301 B2 | 4/2015 | Redlich | |
| 9,628,493 B2* | 4/2017 | Warshavsky | H04L 63/102 |
| 9,654,351 B2* | 5/2017 | Seago | H04L 41/28 |
| 9,712,534 B2* | 7/2017 | Mureinik | G06F 21/604 |
| 9,805,209 B2* | 10/2017 | Naglost | G06F 21/6218 |
| 2003/0061216 A1* | 3/2003 | Moses | G06F 21/6218 |
| 2003/0115481 A1* | 6/2003 | Baird | G06F 21/6218 726/4 |
| 2004/0083367 A1* | 4/2004 | Garg | G06F 21/602 713/170 |
| 2005/0262549 A1* | 11/2005 | Ritt | G06F 21/33 726/1 |
| 2006/0123010 A1 | 6/2006 | Landry et al. | |
| 2009/0024590 A1 | 1/2009 | Surge et al. | |
| 2011/0277017 A1* | 11/2011 | Ivanov | G06F 21/6218 726/4 |
| 2013/0024687 A1* | 1/2013 | Lumb | G06F 21/62 713/165 |
| 2013/0238900 A1* | 9/2013 | Leggette | H04L 63/0428 713/165 |
| 2013/0298202 A1* | 11/2013 | Warshavsky | H04L 63/10 726/4 |
| 2014/0006347 A1 | 1/2014 | Qureshi et al. | |
| 2014/0013400 A1* | 1/2014 | Warshavsky | H04L 63/102 726/4 |
| 2014/0150114 A1* | 5/2014 | Sinha | H04W 12/00 726/28 |
| 2014/0208418 A1* | 7/2014 | Libin | G06F 21/6209 726/19 |
| 2014/0344952 A1* | 11/2014 | Kulick | G06F 21/6245 726/28 |
| 2014/0373165 A1* | 12/2014 | Margolin | G06F 21/606 726/26 |
| 2015/0019480 A1 | 1/2015 | Maquaire et al. | |
| 2015/0363605 A1* | 12/2015 | Plastina | G06F 21/6218 726/28 |
| 2016/0034526 A1* | 2/2016 | Pringuey | G06F 17/30395 707/721 |
| 2016/0057147 A1* | 2/2016 | Mureinik | G06F 21/604 726/4 |
| 2016/0063270 A1* | 3/2016 | Brock | G06F 21/6218 726/28 |
| 2016/0098467 A1* | 4/2016 | Reed | G06F 17/30557 715/765 |
| 2016/0104067 A1* | 4/2016 | Xu | G06F 17/30864 706/46 |
| 2016/0117780 A1* | 4/2016 | Semlani | G06Q 20/123 705/30 |
| 2016/0140354 A1* | 5/2016 | Morris | G06F 17/30233 707/785 |
| 2016/0155135 A1* | 6/2016 | Papa | G06F 17/30867 705/37 |
| 2016/0197872 A1* | 7/2016 | Khattar | H04L 51/32 709/206 |
| 2016/0203327 A1* | 7/2016 | Akkiraju | G06F 21/6218 707/785 |
| 2016/0253505 A1* | 9/2016 | Yancey | G06F 17/30699 726/28 |
| 2016/0292443 A1* | 10/2016 | von Muhlen | G06F 17/30115 |
| 2016/0294881 A1* | 10/2016 | Hua | H04L 63/20 |
| 2016/0335414 A1* | 11/2016 | Isaacs | G06F 19/3456 |
| 2016/0357971 A1* | 12/2016 | Sinha | G06F 21/602 |
| 2016/0357984 A1* | 12/2016 | Van Rotterdam | G06F 21/6218 |
| 2017/0024410 A1* | 1/2017 | Pola | G06F 17/30174 |
| 2017/0034217 A1* | 2/2017 | Anton | H04L 63/20 |
| 2017/0053014 A1* | 2/2017 | Lavallee | G06F 17/30598 |
| 2017/0111367 A1* | 4/2017 | Ivanov | H04L 63/105 |
| 2017/0153883 A1* | 6/2017 | Oliver | G06F 8/65 |
| 2017/0169060 A1* | 6/2017 | Ahuja | G06F 17/30292 |
| 2017/0242831 A1* | 8/2017 | Barker | G06F 17/24 |
| 2017/0250876 A1* | 8/2017 | Seago | H04L 41/28 |
| 2017/0270537 A1* | 9/2017 | Papa | G06F 17/30867 |

* cited by examiner

FIG. 6

*(rotated figure showing a UI window labeled 602 with tabs: SEARCH | ADMINISTRATION | Hi, JOHN STEPHENSON (USERID123) 604 | NOTIFICATIONS | API ACCESS | HELP, SEARCH box, MISSILE heading with CLASSIFICATION | MISSILE tabs, CREATED: Stephen Johnson (USERID456) ON MAY 7, 2014 AT 5:04 PM 606, UPDATED: Stephen Johnson (USERID456) ON MAY 7, 2014 AT 5:04 PM, TEAM PERSONNEL (2), OPPORTUNITY (4), ADD NEW PARAMETER..., ADD NEW PARAMETER..., and a table:)*

| PARAMETER | | GOAL | VALUE (MIN–MAX) | CONFIDENCE | |
|---|---|---|---|---|---|
| MARKET SEGMENT | META | | SEGMENT A | | X |
| MARKET SUBSEGMENT | META | | SUB-SEGMENT B | 608 | X |
| PATENT NUMBER | META | | US 1234567 | 80% | X |
| PLATFORM TYPE | META | | PLATFORM B | | X |

FIG. 7

[SEARCH] Hi, Jane Phillips (userID789) | Notifications | API Access | Help — 704

◇ Missile

Missile

[ Classification | Missile ]

Team Personnel (2)
Opportunity (4)

Created: Stephen Johnson (userID456) on May 7, 2014 at 5:04 PM
Updated: Stephen Johnson (userID456) on May 7, 2014 at 5:04 PM — 606

| Parameter | Goal | Value (Min–Max) | Confidence |
|---|---|---|---|
| Market Segment ⊚ META | | Segment A | |
| Market Subsegment ⊚ META | | Sub-Segment 1 | |
| Patent Number META | | RESTRICTED | 80% — 706 |
| Platform Type ⊚ META | | Platform B | |

— 702

DYNAMIC RUNTIME FIELD-LEVEL ACCESS CONTROL USING A HIERARCHICAL PERMISSION CONTEXT STRUCTURE

TECHNICAL FIELD

The subject matter disclosed herein generally relates to systems and methods for controlling access to one or more fields displayable in an electronic document and, in particular, to systems and methods for dynamic runtime field-level access control using a hierarchical permission context structure.

BACKGROUND

Information systems often allow one or more users access to an electronic document, such as a HyperText Markup Language ("HTML") document. More particularly, such information systems allow these users to access documents that are generated from information stored in one or more electronic databases. The information may be stored as a record in the one or more electronic databases such that, when the electronic document is generated, the records are retrieved from the one or more electronic databases and the electronic document is generated in real time or near real time.

However, in some circumstances, these electronic documents will be generated from sensitive data. In addition, not every user will have the same permissions to access or view data marked as sensitive. Typical solutions to prohibit the accessing or viewing of the sensitive data prevent complete access to the electronic document or to deny unauthorized users from viewing or displaying the electronic document. These solutions are untenable because they prevent information sharing and collaboration as there is a lack of data transparency. In some instances, for regulatory, business, or other reasons, users may have need to see as much data as possible at a field or attribute level.

BRIEF DESCRIPTION OF THE DRAWINGS

Some embodiments are illustrated by way of example and not limitation in the figures of the accompanying drawings.

FIG. 6 illustrates an example graphical user interface, according to an example embodiment, for interacting with an application provided by the application server of FIG. 1.

FIG. 7 illustrates another example graphical user interface, according to an example embodiment, for interacting with the application provided by the application server of FIG. 1.

DETAILED DESCRIPTION

Figure 1:
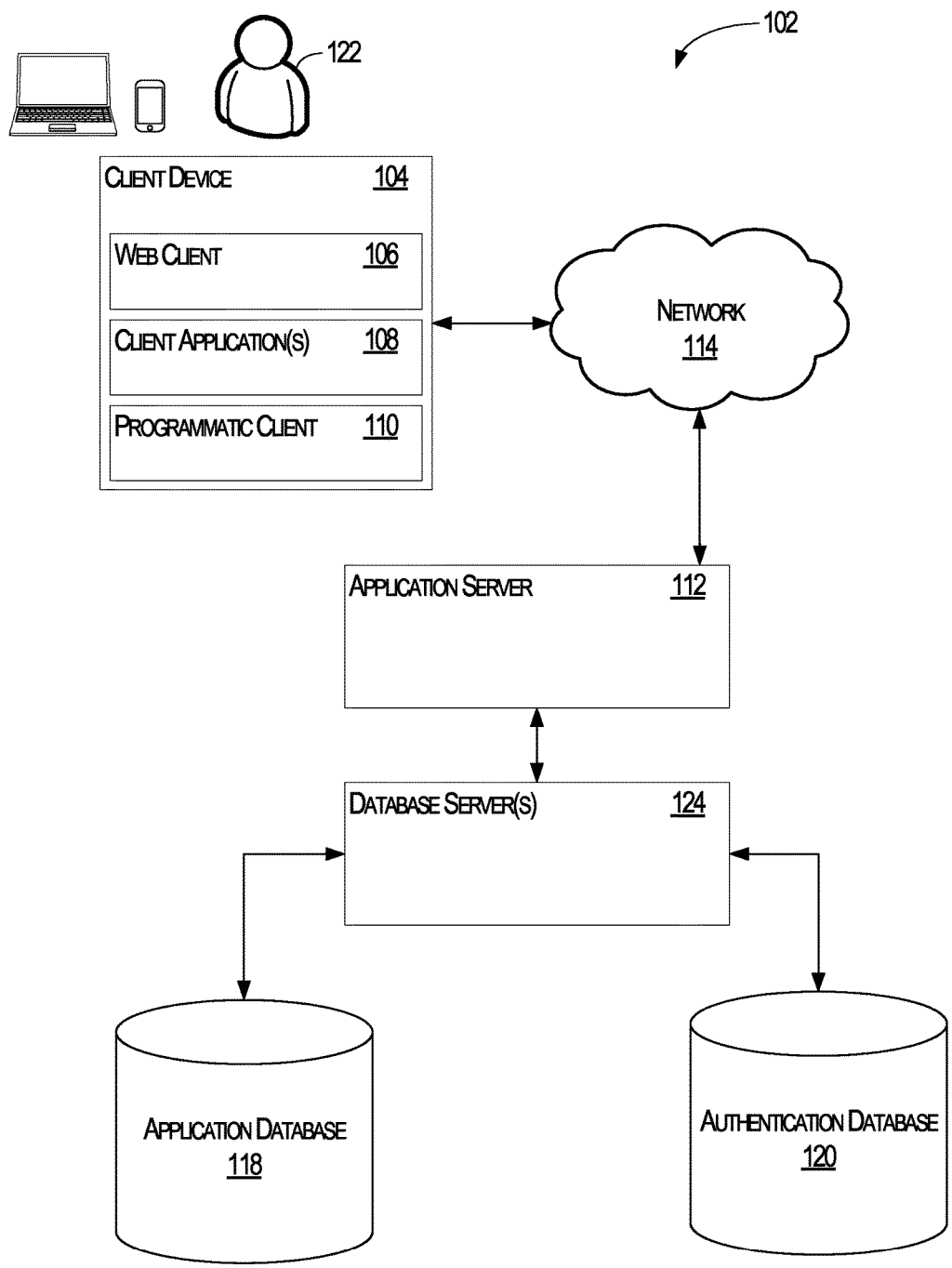
FIG. 1 is a block diagram illustrating a networked system, according to some example embodiments.

Example methods and systems are directed to controlling access to one or more fields displayable in an electronic document and, in particular, to systems and methods for dynamic runtime field-level access control using a hierarchical permission context structure. In one embodiment, the hierarchical permission context structure includes various levels of roles, where each role is assigned one or more permissions. Roles may include, but are not limited to, administrator, data owner, data creator, and general user. Furthermore, roles may be assigned arbitrarily determined names where the names indicate an organization, department, committee, or other organizational structure. In one embodiment, the hierarchical permission context structure is defined as a tree structure where a node of the tree structure may have one or more parent nodes and/or one or more child nodes. A node of the tree structure may correspond with a defined role such that a parent node may represent a role having more permissions than a given role and a child node may represent a role having less permissions than the given role.

In one embodiment, each level of the hierarchical permission context structure is assigned one or more permissions. Starting with the root node, this node may have the most amount of permissions (e.g., the least number of restrictions) whereas the bottommost leaves of the structure may have the least amount of questions (e.g., the most number of restrictions). Alternatively or in addition, each role (e.g., each node) may be associated with one or more permissions. The one or more permissions assigned to the one or more roles indicate the amount of control a given user has over data displayable by an application server. For example, the one or more permissions may indicate whether a user can edit the data, view the data, delete the data, or otherwise manipulate or modify the data. Thus, roles that are assigned to nodes located at lower levels of the hierarchical permission context structure may have more restrictions whereas roles are assigned to nodes located at higher levels of the hierarchical permission kind of structure may have less restrictions. As an example, an "administrator" will have more permissions than a "general user."

An application server provides access to electronic documents that are generated from data stored in one or more electronic databases. In one embodiment, an electronic document includes one or more fields where a selected field has a corresponding record in the one or more electronic databases. Furthermore, and in one embodiment, a given record includes metadata about the data for the selected field (e.g., the data stored in the record), such as the type of data represented by the record, the user that created the record, a label indicating what type of data the data represents, a unique identifier that identifies the record, whether the data is generally viewable, any classified level associated with the data, and the data itself (e.g., the value of the record). When the application server is accessed by a user and an electronic document is requested, the application server generates the electronic document from the data stored in the record and evaluates whether the user requesting the data is authorized to view the data in view of the metadata corresponding to the requested data. In one embodiment, where the user is not authorized to view the value of the requested data, the disclosed systems and methods permit the user to know that the data exists, but not the value of the data.

As the determination of whether the user is permitted to view the requested data is performed at or about the time the data is requested, the system can generate the requested electronic documents in near real-time (e.g., at or about the time the electronic document is requested). Furthermore, as the time determination for the requested data is performed on a field-level basis (e.g., the individual fields of the electronic document are evaluated), the disclosed systems and methods can selectively determine those fields that the user is permitted to view the corresponding data and those fields that the user is prohibited from viewing. In this manner, the disclosed systems and methods provide a technical benefit over prior art solutions in that requested electronic documents are customized for each requesting user, and that the determination of whether a user can view the data associated with a given field is made more efficient through the hierarchical permission context structure.

With reference to FIG. 1, an example embodiment of a high-level client-server-based network architecture 102 is shown. An application server 112 provides server-side functionality via a network 114 (e.g., the Internet or wide area network (WAN)) to one or more client devices 104. FIG. 1 illustrates, for example, a web client 106 (e.g., a browser, such as the Internet Explorer® browser developed by Microsoft® Corporation of Redmond, Wash. State), an application 108, and a programmatic client 110 executing on client device 104. The application server 112 is further communicatively coupled with one or more database servers 124 that provide access to one or more databases 118-120.

The client device 104 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, or any other communication device that a user 122 may utilize to access the application server 112. In some embodiments, the client device 104 may comprise a display module (not shown) to display information (e.g., in the form of user interfaces). In further embodiments, the client device 104 may comprise one or more of a touch screens, accelerometers, gyroscopes, cameras, microphones, global positioning system (GPS) devices, and so forth. The client device 104 may be a device of a user 122 that is used to perform one or more searches for user profiles accessible to, or maintained by, the social networking server 112.

In one embodiment, the application server 112 is a network-based appliance that responds to initialization requests or search queries from the client device 104. One or more users 122 may be a person, a machine, or other means of interacting with client device 104. In various embodiments, the user 122 is not part of the network architecture 102, but may interact with the network architecture 102 via the client device 104 or another means. For example, one or more portions of network 114 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 104 may include one or more applications (also referred to as "apps") such as, but not limited to, a web browser, messaging application, electronic mail (email) application, an application access client, and the like. In some embodiments, if the application access client is included in the client device 104, then this application access client is configured to locally provide the user interface and at least some of the functionalities with the application configured to communicate with the application server 112, on an as needed basis, for data and/or processing capabilities not locally available (e.g., access to a member profile, to authenticate a user 122, to verify a user's permissions, etc.). Conversely if the application access client is not included in the client device 104, the client device 104 may use its web browser to access the initialization and/or search functionalities of the application server 112.

One or more users 122 may be a person, a machine, or other means of interacting with the client device 104. In example embodiments, the user 122 is not part of the network architecture 102, but may interact with the network architecture 102 via the client device 104 or other means. For instance, the user 122 provides input (e.g., touch screen input or alphanumeric input) to the client device 104 and the input is communicated to the networked system 102 via the network 114. In this instance, the application server 112, in response to receiving the input from the user 122, communicates information to the client device 104 via the network 114 to be presented to the user 122. In this way, the user 122 can interact with the application server 112 using the client device 104.

Further, while the client-server-based network architecture 102 shown in FIG. 1 employs a client-server architecture, the present subject matter is of course not limited to such an architecture, and could equally well find application in a distributed, or peer-to-peer, architecture system, for example.

In addition to the client device 104, the application server 112 communicates with other one or more database server(s) 124 and/or database(s) 118-120. In one embodiment, the application server 112 is communicatively coupled to an application database 118 and an authentication database 120. The databases 118-120 may be implemented as one or more types of databases including, but not limited to, a hierarchical database, a relational database, an object-oriented database, one or more flat files, or combinations thereof. Examples of commercially available databases that may be used as the databases 118-120 include Oracle Database 12c and MySQL, which are both available from the Oracle Corporation.

The application server 112 provides access to one or more electronic documents displayable by the client device 104. The electronic documents are dynamically generated by the application server 112 using data stored in the application database 118. As discussed below with reference to FIG. 2, the application server 112, in various embodiments, includes a server-side interpreter that generates the electronic documents according to a computer-programming language and/or computer-scripting language. The one or more electronic documents may have one or more defined fields which correspond to one or more records stored in the application database 118. Accordingly, and in one embodiment, the application database 118 stores one or more records for data retrieval by the application server 112. As discussed below with reference to FIG. 5, the one or more records may include one or more fields that describe the data corresponding to a given record. As electronic documents are requested by the client device 104, the application server 112 determines whether the data stored in a given record corresponding to a field in a given electronic document is displayable by the client device 104. As explained further below, this determination may be performed by comparing the user permissions associated with a given record with the user permissions associated with the user of the client device 104 requesting the electronic document.

In addition to the application database 118, the application server 112 is communicatively coupled to an authentication database 120. In one embodiment, the authentication database 120 includes one or more records corresponding to users of the application server 112. Each record may include one or more fields that identify the roles assigned to a corresponding user. As discussed below with reference to FIG. 4, the authentication database 120 may store a hierarchical permission context structure that defines the permissions a role has with respect to the data stored in the application database 118. In one embodiment, the hierarchical permission context structure is representable as a tree structure, where the tree structure includes one or more nodes connected by one or more edges. The root node may correspond to an administrative role, with the administrative role has the most permissions with respect to the data stored in the application database 118. With this role, such permissions may include, but are not limited to, creating new records, defining and/or modifying fields within each record, modifying or otherwise manipulating the data stored within the fields for each record, and other such permissions. As the depth level for the tree increases, the nodes at a given depth level may have fewer permissions (e.g., more restrictions) than the nodes closer to the root node. For example, the restricted permissions may include being able to only read data, being able to read only certain types of data, having a specified classified level that determines which data is viewable to the role corresponding to the record, and other such permissions. In addition, for each record in the authentication database 120, and in one embodiment, the record includes a field that stores and node identifier that identifies the node corresponding to the given record. The record may further include other node identifiers, such as a parent node identifier, one or more child node identifiers, and other such node identifiers.

When a user is defined within the authentication database 120 (e.g., a new record is created for the corresponding user) the new record may include an identifier that identifies the role (e.g., the node within the hierarchical permission context structure) to which the user belongs. In this manner, an administrator simply defines the role for a given user to identify the fields of an electronic document that a user may manipulate rather than having to define the permissions with respect to each field of the electronic document.

In one embodiment, the application server 112 communicates with the various databases 118-120 through one or more database server(s) 124. In this regard, the database server(s) 124 provide one or more interfaces and/or services for providing content to, modifying content, removing content from, or otherwise interacting with the databases 118-120. For example, and without limitation, such interfaces and/or services may include one or more Application Programming Interfaces (APIs), one or more services provided via a Service-Oriented Architecture ("SOA"), one or more services provided via a REST-Oriented Architecture ("ROA"), or combinations thereof. In an alternative embodiment, the application server 112 communicates with the databases 118-120 and includes a database client, engine, and/or module, for providing data to, modifying data stored within, and/or retrieving data from, the one or more databases 118-120.

While the database server(s) 124 are shown to include the application server 112, one of ordinary skill in the art will recognize that other servers may also be included in the database server(s) 124. For example, database server(s) 124 may include, but are not limited to, a Microsoft® Exchange Server, a Microsoft® Sharepoint® Server, a Lightweight Directory Access Protocol ("LDAP") server, any other server configured to provide information, or combinations thereof. Accordingly, and in one embodiment, the servers implemented by the organization and configured to access the application database 118 and/or the authentication database 120 are further configured to communicate with the application server 112.

Figure 2:
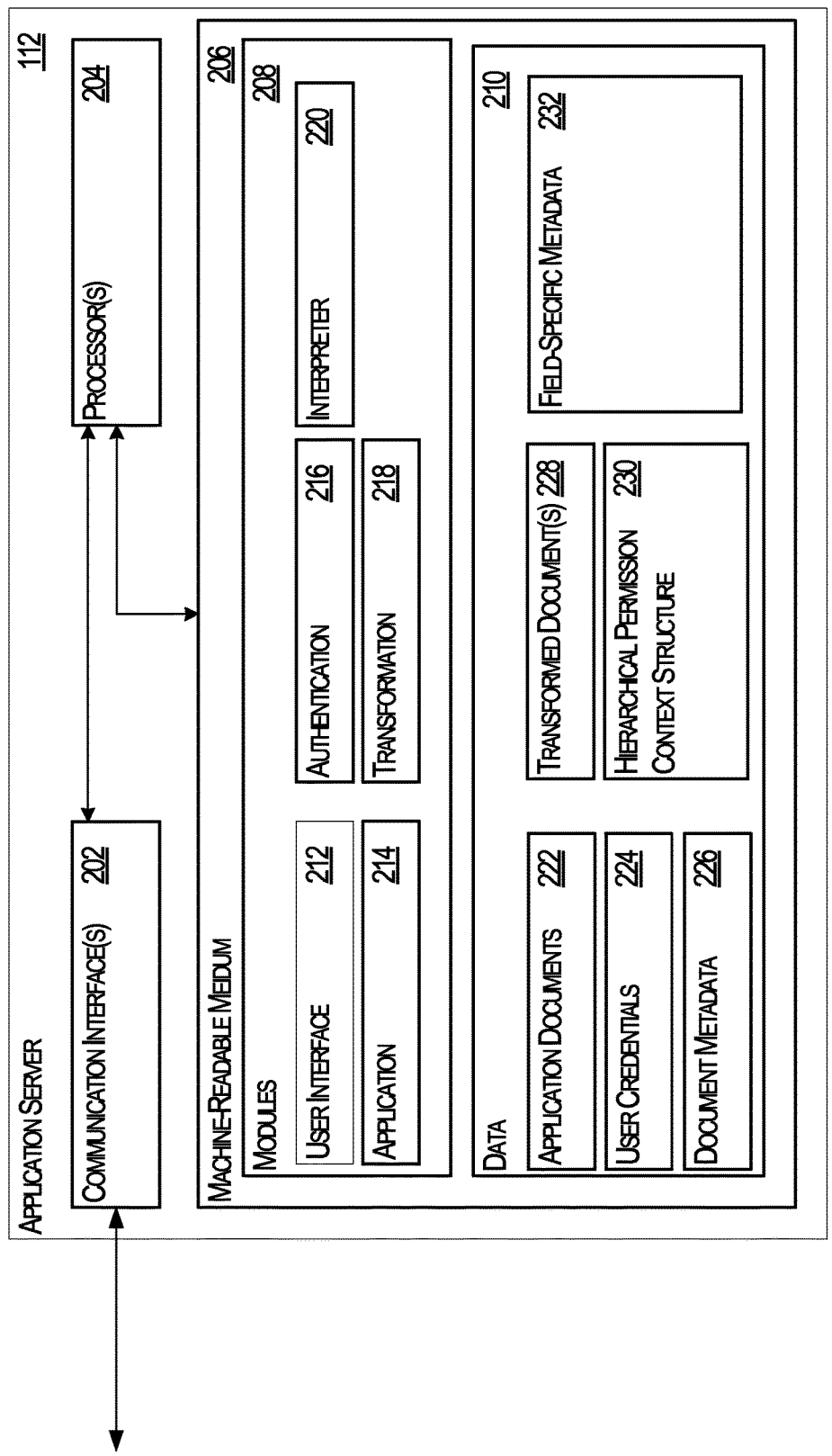
FIG. 2 illustrates the application server of FIG. 1, according to an example embodiment.

FIG. 2 illustrates the application server 112 of FIG. 1 in accordance with an example embodiment. In one embodiment, the application server 112 includes one or more processor(s) 204, one or more communication interface(s) 202, and a machine-readable medium 206 that stores computer-executable instructions for one or more modules(s) 208 and data 210 used to support one or more functionalities of the modules 208.

The various functional components of the application server 112 may reside on a single device or may be distributed across several computers in various arrangements. The various components of the application server 112 may, furthermore, access one or more databases (e.g., databases 118-120 or any of data 210), and each of the various components of the application server 112 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, Texas Instruments, or other such processors. Further still, the one or more processors 204 may include one or more special-purpose processors, such as a Field-Programmable Gate Array (FPGA) or an Application Specific Integrated Circuit (ASIC). The one or more processors 204 may also include programmable logic or circuitry that is temporarily configured by software to perform certain operations. Thus, once configured by such software, the one or more processors 204 become specific machines (or specific components of a machine) uniquely tailored to perform the configured functions and are no longer general-purpose processors.

The one or more communication interfaces 202 are configured to facilitate communications between the application server 112, the client device 104, and one or more of the database server(s) 124 and/or database(s) 118-120. The one or more communication interfaces 202 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combination of such wired and wireless interfaces.

The machine-readable medium 206 includes various modules 208 and data 210 for implementing the organizational directory server 112. The machine-readable medium 206 includes one or more devices configured to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the modules 208 and the data 210. Accordingly, the machine-readable medium 206 may be implemented as a single storage apparatus or device, or, alternatively and/or additionally, as a "cloud-based" storage systems or storage networks that include multiple storage apparatus or devices. As shown in FIG. 2, the machine-readable medium 206 excludes signals per se.

In one embodiment, the modules 208 are written in a computer-programming and/or scripting language. Examples of such languages include, but are not limited to, C, C++, C#, Java, JavaScript, Perl, PHP, Python, or any other computer programming and/or scripting language now known or later developed.

With reference to FIG. 2, the modules 208 of the social networking server 112 include, but are not limited to, a user interface module 212, an application module 214, an authentication module 216, a transformation module 218, and interpreter module 220. The data 210 supporting these modules 208 include, but is not limited to, one or more application documents 222 (e.g., one or more electronic documents), user credentials 224, document metadata 226, one or more transformed electronic documents 228, the hierarchal permission context structure 230, and field specific metadata 232.

The user interface module 212 is configured to provide access to, and interactions with, the application server 112. In one embodiment, the user interface module 212 provides one or more graphical user interfaces, which may be provided using the Hypertext Transfer Protocol (HTTP). The graphical user interfaces are displayable by the client device 104 and accept input from the user 122 for interacting with the application server 112. Further still, the user interface module 212 may be configured to provide such interfaces to one or more client applications displayable by the client device 104, such as the web client 106, one or more client applications 108, or the programmatic client 110. By interacting with the user interface module 212, the user 122 can cause the application server 112 to retrieve data from, and push data to, one or more of the databases 118-120. In one embodiment, the user interface module 212 communicates with the application module 214 and the interpreter module 220 to provide requested electronic documents to the client device 104.

The application module 214 is configured to provide access to one or more electronic documents (e.g., application documents 222) along with the field-level data used to generate these documents. In one embodiment, the application module 214 acts as an intermediary between the user interface module 212, which displays the requested electronic documents, and the one or more databases 118-120, which store the data used to generate the electronic documents. Further still, requests for electronic documents may be processed by the application module 214 to determine whether the user requesting the electronic documents has authorization to view the data used to generate the electronic documents or displayed by the electronic documents. As discussed below with reference to FIG. 3, and in one embodiment, the application module 214 invokes the authentication module 216 and/or the transformation module 218 as the application documents 222 are being requested by the client device 104. In this manner, the application module 214 is configured to validate that the user requesting the documents is authorized to view the data associated with one or more fields that comprise the requested one or more electronic documents.

The authentication module 216 is configured to authenticate a user and identify the one or more roles assigned to the user in providing the electronic documents to the client device 104. In one embodiment, the user provides one or more user credentials via the client device 104 to the application server 112, which are stored as the user credentials 224. In one embodiment, the user credentials 224 include a username and password, which the user may provide by typing such credentials into an input device (e.g., a keyboard) communicatively coupled, or integrated with, the client device 104. Additionally or alternatively, the user credentials 224 include biometric credentials such as fingerprint data, retina data, voice data, or other such biometric data. Using the provided credentials, the authentication module 216 confirms that the user is authorized to access the application server 112. In one embodiment, the confirmation is performed by comparing previously provided user credentials with the credentials being currently provided by the user. The results of the comparison indicate whether the user 122 is authorized to access the application server 112.

Having authenticated the user 122, the authentication module 216 then determines the one or more roles assigned to the user 122. In one embodiment, the authentication module 216 retrieves a record from the authentication database 120 corresponding to the user 122. More specifically, and as an example, the authentication module 216 retrieves a field, such as a role field, from the corresponding record that identifies the roles to which the user 122 is assigned. The authentication module 216 then cross-references the hierarchical permission context structure 230 with the role identifier assigned to the user 122 to determine the permissions that the user 122 has with respect to the data stored in the application database 118. As discussed above, and in one embodiment, the hierarchical permission context structure 230 is stored as one or more records in the authentication database 120 where one or more fields of each record identifies parent nodes and/or child nodes for a given record.

The transformation module 218 is configured to transform one or more of the application documents 222 given the permissions of the user 122 determined by the authentication module 216. In one embodiment, transforming the one or more application documents 222 includes removing data from an application document prior to its transmission to the client device 104 for display to the user 122. In another embodiment, transforming the one or more application documents 222 includes identifying fields for which the user 122 does not have permission to view and replacing the data for those identified fields with an identifier or message indicating that the user 122 does not have permission to view the field data. To determine which of the fields the user 122 may or may not view, the transformation module may retrieve one or more records from the application database 118 that correspond to the identified fields of the one or more application documents 222. The data from the records may then be stored as the field-specific metadata 232, which the transformation module 218 references to determine whether the user 122 has authorization to view the data associated with a given field.

Additionally or alternatively, the transformation module 218 may obtain document specific metadata 226 from the application database 118, where the document specific metadata 226 provides metadata about one or more of the application documents 222 requested by the client device 104. In one embodiment, and like the field-specific metadata 232, the application database 118 includes one or more records that have fields that characterize a corresponding application. In this regard, and in one embodiment, the document specific metadata 226 includes, but is not limited to, the creator of the application document, the date and/or time the application document was created, the date and/or time the application document whether the application document is publicly viewable, one or more classified levels (if any) assigned to the application document, the application document type, and other such document specific metadata.

Furthermore, and in one embodiment, the transformation module 218 maintains a list of those fields that have been redacted, and includes such a list in the transmission to the client device 104. Application documents that have been processed may be stored as the transformed documents 228. In this manner, the client device 104 receives a list of those fields that the user is not able to view. In one embodiment, such list is used by an application of the client device 104 to display an identifier or indicator of the field that the user does not have permission to view.

Figure 3:
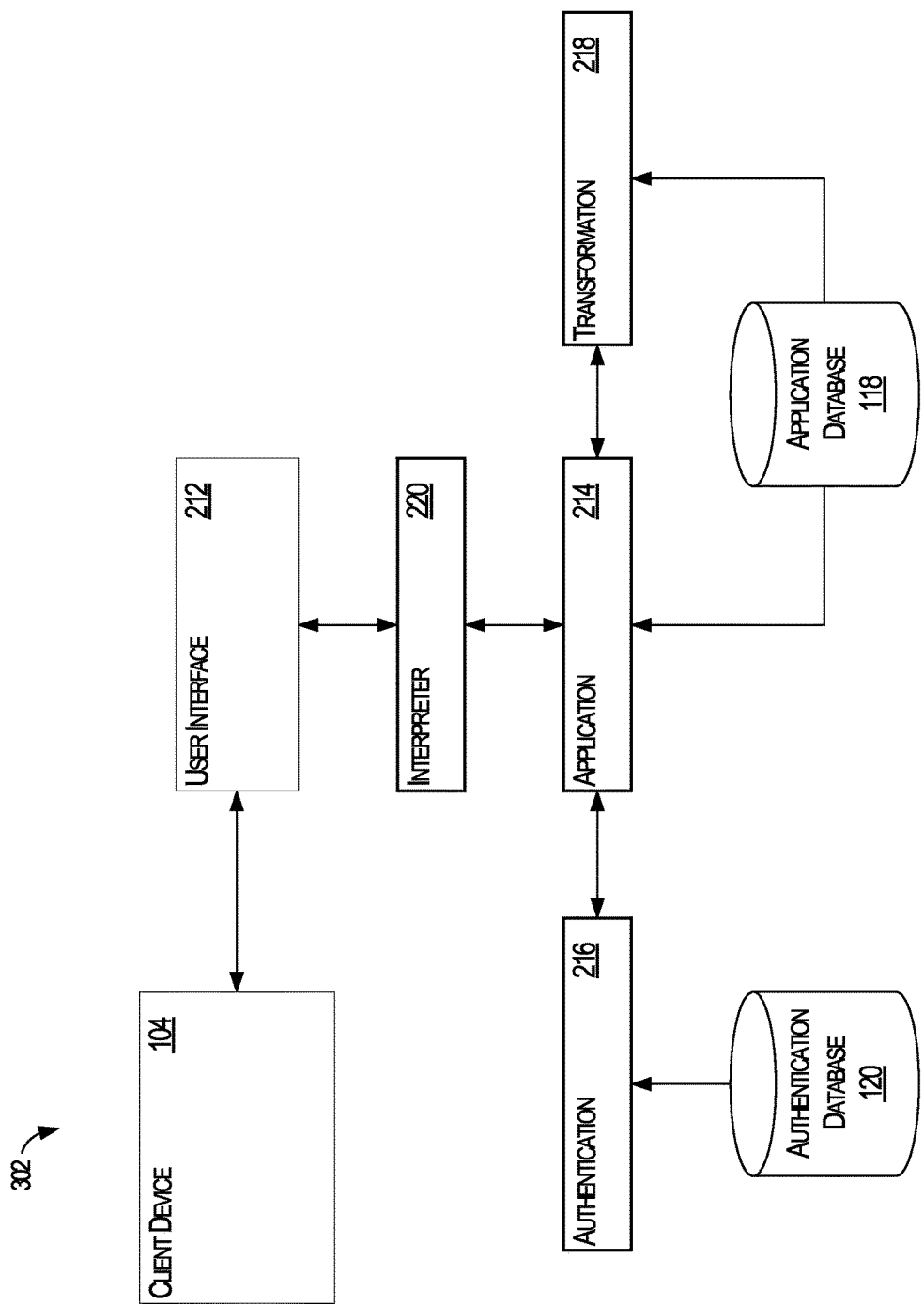
FIG. 3 illustrates a block diagram, according to an example embodiment, illustrating the interactions between the modules of the application server and the client device of FIG. 1.

FIG. 3 illustrates a block diagram 302, according to an example embodiment, illustrating the interactions between the modules 208 of the application server 112 and the client device 104 of FIG. 1. As shown in FIG. 3, a user of the client device 104 requests one or more electronic documents (e.g., dynamically-generated webpages, spreadsheets, images, non-webpage documents, etc.) via the user interface module 212. The user interface module 212, in turn, is communicatively coupled to the interpreter module 220 for interpreting requests and generating the requested documents. In one embodiment, the interpreter module 220 is a server-side interpreter such as a PHP interpreter, a Python interpreter, a Ruby interpreter, any other interpreter now known or later developed, or combinations thereof. While FIG. 3 illustrates that the user interface module 212 communicates with the interpreter module 220, one of ordinary skill in the art will recognize that, in some instances, the user interface module 212 may communicate with the application module 214 directly rather than through the interpreter module 220. In this regard, any communication pathways illustrated in FIG. 3 are meant to illustrate one embodiment; there may be instances where communication pathways are established between different modules (e.g., a direct communication pathway between the authentication module 216 and transformation module 218) and such arrangements are contemplated as falling within the scope of this disclosure.

The application module 214 is communicatively coupled to the authentication module 216 and the transformation module 218. Accordingly, in one embodiment, when user credentials are provided to the application module 214 via the user interface module 212, the application module 214 invokes the authentication module 216 to determine whether the user 122 is authorized to access the requested electronic documents and/or to determine one or more roles assigned to the user 122. Accordingly, and as discussed previously, the authentication module 216 queries authentication database 120 with the provided user credentials. In response to the query, the authentication database 120 returns whether the user is authorized to access the one or more electronic documents and/or the one or more roles assigned to the user 122. In addition, the authentication module 216 may query the authentication database 122 determine whether the user 122 is associated with any classified levels, user restrictions, or other such user related permissions. The determination of whether the user 122 is authorized to access the requested electronic documents and/or the one or more roles assigned to the user 122 are communicated to the application module 214.

As discussed above, the application module 214 is also communicatively coupled with the transformation module 218. In this regard the application module 214 invokes the transformation module 214 to redact or remove data from one or more of the electronic documents prior to their transmission to the client device via the interpreter module 220 and/or the user interface module 212. In one embodiment, the application module 214 communicates the one or more roles assigned to the user 122 to the transformation module 218. More particularly, the application module 214 communicates one or more role identifiers (e.g., node identifiers) to the transformation module 218. In turn, the transformation module 218 queries the application database 118 for metadata about the requested electronic documents. In one embodiment, the transformation module 218 request the metadata for each data field appearing in the requested one or more electronic documents. Using the requested metadata from the application database 118, transformation module 218 determines whether the user 122 can view the corresponding data for the data fields of the one or more electronic documents. In one embodiment, the requested metadata includes one or more user identifiers and the transformation module 218 communicates with the authentication module 216 to retrieve the one or more roles assigned to the user identifiers. In this way, the transformation module 218 compares the one or more roles assigned to the user 122 with the roles corresponding to the user identifiers of the metadata from the application database 118.

In response to the comparison, the transformation module 218 determines whether data stored in the application database 118 is made viewable to the user 122 of the client device 104. As discussed above with regard to FIG. 2, requested electronic documents that have been modified and/or transformed by the transformation module 218 become transformed documents 228. In one embodiment, the transformation module 218 replaces data for which the user 122 is not authorized to view with a predetermined identifier or null value that signifies that the user 122 is not authorized to view the data with a given field. Furthermore, the transformation module 218 may include a list of the fields for which the user 122 is not authorized to view. These listed fields may be displayed to the user 122 via the user interface module 212 so that the user 122 is placed on notice that data exists for the listed fields but that the user 122 does not have sufficient authorization or clearance to view the data for the listed fields.

While the foregoing discussion of the transformation module 218 focuses on a field level analysis of requested electronic documents, and alternative embodiments, the application database 118 may also store metadata for one or more of the requested electronic documents. Thus, similar to the metadata for the fields of electronic documents, the electronic documents may also have similar metadata. Accordingly, and in some circumstances, the transformation module 218 may request the metadata for the electronic documents in determining whether the user 122 requesting such documents is authorized to view the data associated therewith.

Figure 4:
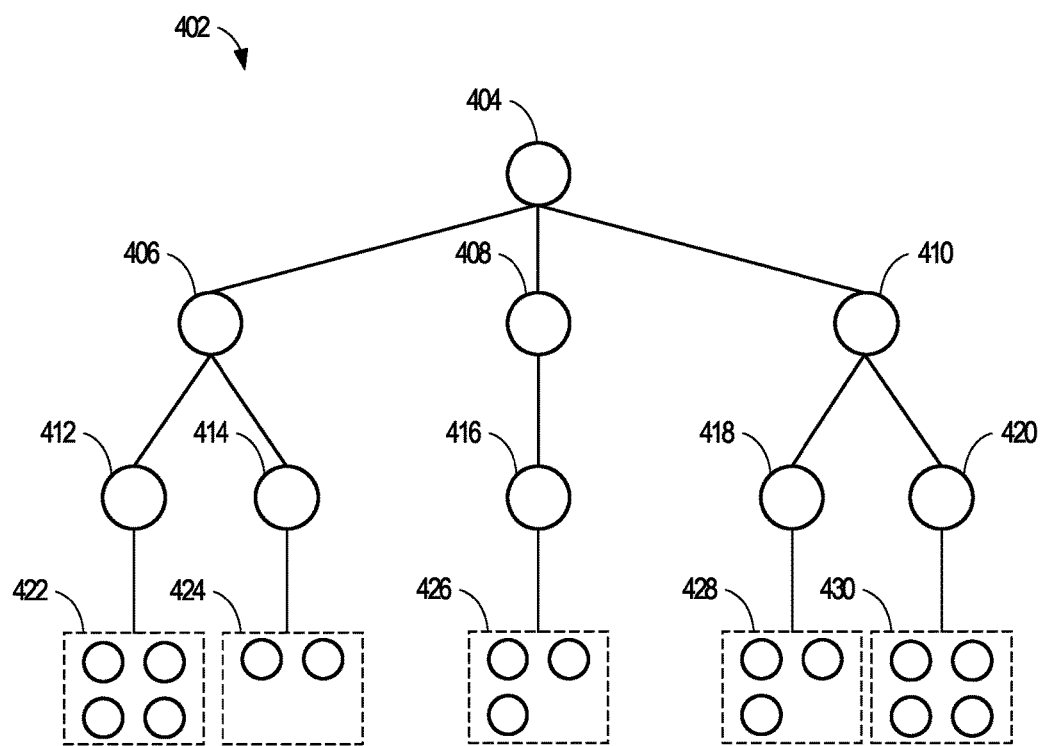
FIG. 4 illustrates a hierarchical permission context structure according to an example embodiment.

Referring to FIG. 4 is a hierarchical permission context structure 402 according to an example embodiment. As shown in FIG. 4 the hierarchical permission context structure 402 is similar to a logical tree structure having a plurality of nodes 404-430 with one or more edges connecting the various nodes 404-430. In the example shown in FIG. 4, the hierarchical permission context structure 402 includes a root node 404 which may correspond to a user role of administrator or superuser having permissions reserved for such role including, but not limited to, creating data, deleting data, modifying data, creating new fields, or otherwise manipulating the one or more electronic documents accessible by the application server 112.

As the depth level for the hierarchical permission context structure 402 increases, the permissions for the nodes at the given depth level may be different than the permissions for the nodes at previous levels. For example, the nodes at higher depth levels may have less permissions than the nodes at lower depth levels. In this regard, nodes 406-410 may have fewer permissions than the node 404. For example, the nodes 406-410 may have all of the permissions of the note 404 with the exceptions of such as permissions as being able to delete and/or add records to the application database 118. Moving to the next depth level (e.g., the nodes 412-420), the nodes 412-420 at this the depth level may have fewer permissions than the nodes above it. However, in alternative embodiments, the permissions of the nodes 406-410 may be configurable such that the permissions of the nodes vary. For example, the node 406 may have different permissions than the node 410, and as one example, the node 406 may have the same, or fewer permissions, than the node 410.

Alternatively or additionally, it is possible that, in some configurations of the hierarchical permission context structure 402, the permissions assigned to one or more nodes of a given branch do not vary or have minor variations. For example, node 406, node 412, and the group of nodes 422 may have similar permissions to the root node 404. In this regard, the branch of nodes that includes node 406, the node 412, and the node group 422 may be structured as shown in FIG. 4 for organizational purposes rather than to substantively change the permissions assigned thereto.

In one embodiment, the nodes of the hierarchical permission context structure 402 correspond to organizational groupings (e.g., departments, committees, working groups, etc.) of an organization. Furthermore each of the nodes 404-430 may be associated, or assigned, a unique identifier (e.g., one or more alphanumeric characters) that identifies the corresponding node. In this regard, a record in the authentication database 120 corresponding to a user has a role field that is populated with one or more of the unique identifiers assigned to the nodes 404-430 of the hierarchical permission context structure 402. Thus, through the association of node identifiers with the records of the authentication database 120, users of the application server 112 may be assigned one or more roles.

Furthermore, a user may be assigned a unique identifier that identifies the user. For example, a field of a record of the authentication database 120 may store a value representing the unique identifier. Accordingly, and in one embodiment, to determine the roles assigned to a given user, a module of the application server 112 queries the authentication database 120 with the user credentials and/or user identifier and, in response, receives the one or more role identifiers assigned to the user. Using the retrieved one or more role identifiers, the module then cross-references the hierarchical permission context structure 402 to determine the permissions that the user has with regard to one or more fields of the requested electronic document.

Figure 5:
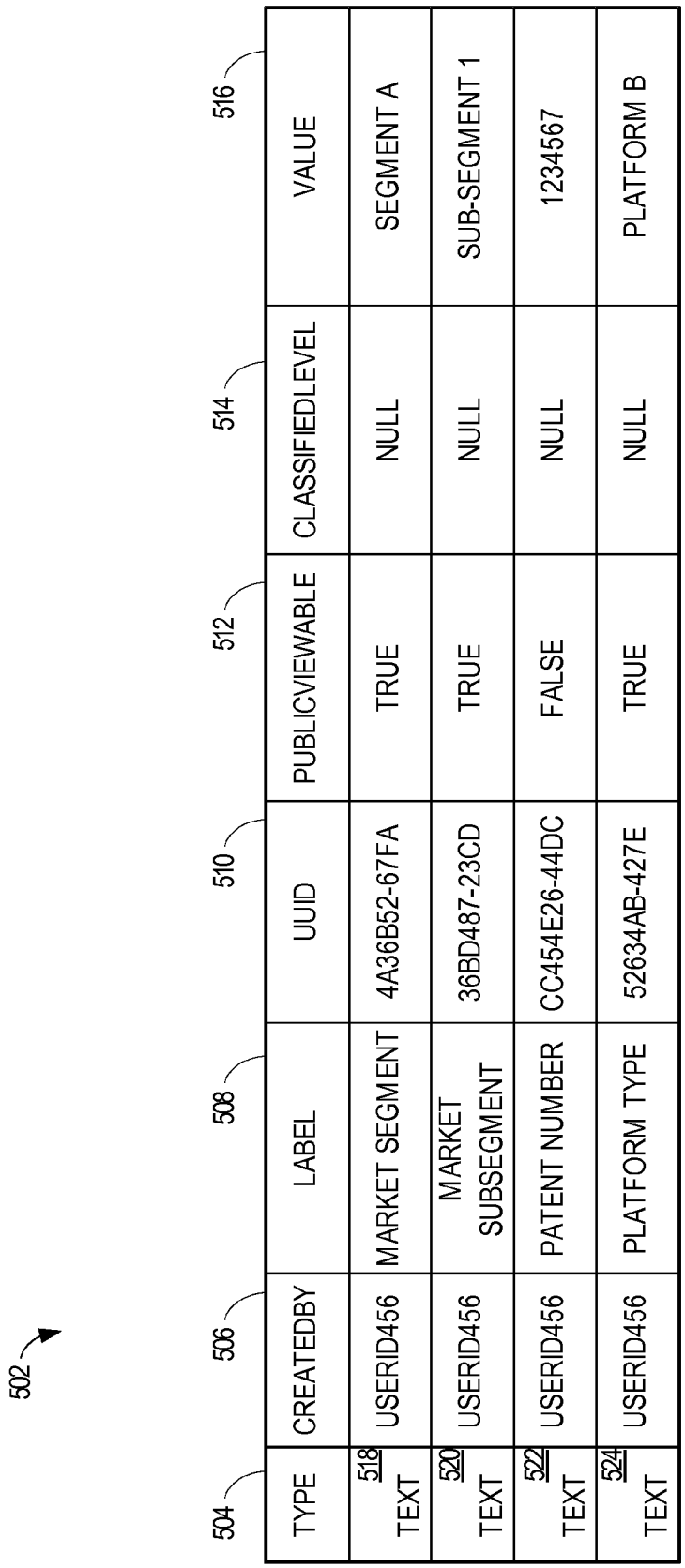
FIG. 5 illustrates example records from the application database of FIG. 1, according to an example embodiment.

Referring to FIG. 5 are example records 518-524 from the application database 118 of FIG. 1, according to an example embodiment 502. As shown in FIG. 5, the records 518-524 include one or more fields 504-516. In one embodiment, the fields 504-516 include a "type" field 504, a "created by" field 506, a "label" field 508, a "unique identifier" field 510, a "public viewable" field 512, a "classified level" field 514, and a "value" field 516. While FIG. 5 illustrates that an example record includes fields 504-516, one of ordinary skill in the art will recognize that a record may include alternative, fewer, or additional fields. Accordingly, such variations and configurations are contemplated as falling within the scope of this disclosure.

Starting with the "type" field 504, this field 504 indicates the type of data stored by a given record. The types of data storable by the records of the application database 118 include any type of data displayable or transmittable to the client device 104. In some circumstances, the types of data storable by the records of the application database 118 correspond to those datatypes displayable in a webpage such as text data, numerical data, graphical data, hyperlinks, sound data, form data (e.g., a checkbox, a radio button, a drop-down menu, etc.), or any other type of data displayable in a webpage. As shown in FIG. 5, the field 504 indicates that the records 518-524 store data corresponding to text data. Referring next to the "created by" field 506, this field 506 stores a value identifying the user that created the record for the corresponding field. As shown in FIG. 5, the user is identified by a user identifier, and in this case, the user identifier appears as "USERID456." As discussed previously, a module may use this user identifier to determine the permissions a given user has with respect to the data stored in the "value" field 516. In this manner, when another user accesses the application server 112, the transformation module 218 retrieves the one or more roles assigned to the user identifier of "USERID456" and compares the retrieved one or more roles with the roles assigned to the current user. In an alternative embodiment, and as discussed further below, the transformation module 218 retrieves the one or more roles assigned to the current user identifier and cross-references the permissions assigned to the one or more roles to determine whether the current user has permission to view the data stored in given record.

With reference to the "label" field 508, this field 508 indicates the name of the field that is to appear in an electronic document. In this regard, and as one example, an electronic document that includes a field corresponding to record 518 would show the words "Market Segment" to indicate the presence of the field corresponding to record 518. Similarly, other electronic documents that include fields corresponding to records 520-524 would include the words "Market Subsegment," "Patent Number," and "Platform Type" to indicate the field within their respective electronic document. In this manner, when an electronic document is generated dynamically and includes an identifier referencing a given record, the name of the field represented by the identifier is incorporated into the dynamically generated electronic document.

Next, the "UU ID" field 510 (or unique identifier field) stores a series of alphanumeric characters that uniquely identify a corresponding field and/or record. In this regard, should an electronic document include the unique identifier (e.g., the UU ID) unique identifier may be replaced with one or more portions of the corresponding record, such as the text data in the "label" field 508 or the value of the field stored in the "value" field 516 of the corresponding record.

The next two fields 512-514 (e.g. the "publicviewable" field 512 and the "classified level" field 514) indicate, respectively, whether a given record is publicly viewable to all users of the application server 112 and any classified level required to view the data of a given record. As shown in FIG. 5, the records 518, 520, 524 are publicly viewable as indicated by the Boolean value of "TRUE" stored in the "publicviewable" field 512 of the records 518, 520, 524. Accordingly, and in this example, any authorized user of the application server 112 may view the data stored in the "value" field 516 of records 518, 520, 524. As a different example, the record 522 is not publicly viewable as indicated by the Boolean value of "FALSE" stored in the "publicviewable" field 512. Accordingly, in this alternative example, a user that desires to view the data stored in the "value" field 516 of the record 522 would need to be assigned one or more roles that has permissions to view such data. As discussed below, where a user does not have such permissions, the user may be presented with a predetermined value or identifier indicating that he or she does not have authorization to view the data stored in the "value" field 516. Referring to the "classified level" field 514

Finally, and with reference to the "value" field 516, this field 516 stores the value to be displayed with, or incorporated into, the requested one or more electronic documents. As shown in FIG. 5, the data stored in the "value" field 516 for each of the records 518-524 is text data, where the value data for the record 518 is "SEGMENT A," the value data for the record 520 is "SUB-SEGMENT 1," the value data for the record 522 is "1234567," and the value data for the record 524 is "PLATFORM B." While the value data for each of the records 518-524 is text data, other types of data may be used as value data for the records 518-524. For example, the value data may include image data, a hyperlink to an electronic file (e.g., an image file, a sound file, a text-based file, etc.), sound data, video data, or any other types of data. As discussed, where the user 122 is authorized to view the value data, the value data is included in the requested one or more electronic documents. However, where the user 122 is not authorized to view the value data, the transformation module 218 replaces the value data with a previously determined value or identifier to signify that the user 122 is not authorized to view the value data. In one embodiment, where the value data from one or more of the records 518-520 is replaced, the transformation module 218 communicates the replaced value data to the application module 214 and/or the interpreter module 220, which then dynamically generates the requested electronic documents using the replaced value data rather than the value data from the one or more records 518-520. In this manner, the user 122 is made aware that a value exists for a given field (e.g., the "Patent Number" field, corresponding to record 522), but is not provided with the value of the given field.

FIG. 6 illustrates an example graphical user interface 602, according to an example embodiment, for interacting with an application provided by the application server of FIG. 1. In one embodiment, the graphical user interface 602 is displayed by one or more of the applications of the client device 104, such as the web client 106, client application(s) 108, or the programmatic client 110. As shown in FIG. 6, a first user 604 has accessed an application provided by the application server 112. In one embodiment, the application server 112, via the user interface module 212 and the application module 214, dynamically generates an electronic document from data stored in the application database 118. Accordingly, the graphical user interface 602 displays an electronic document showing information about various fields retrieved from the application database 118. With reference to FIG. 5, such fields may include the "Market Segment" field (e.g., record 518), the "Market Subsegment" field (e.g., record 520), the "Patent Number" field (e.g. record 522), and the "Platform Type" field (e.g., record 524).

As shown in FIG. 6, a second user 606, different than the first user 604, has created the electronic document displayed in the graphical user interface 602. Furthermore, the second user 606 may be responsible for providing the data values for the various records used to generate the displayed electronic document. Accordingly, to determine whether the first user 604 is authorized to view the data displayable by the electronic document, the transformation module 218 compares the permissions of the one or more roles assigned to the first user 604 with the roles authorized to view of the data displayable in the electronic document. In one embodiment, the determination is performed by comparing the roles of the first user 604 the roles assigned to the second user 606 (or the user having created one or more of the fields displayable in an electronic document). In another embodiment, the determination is performed by identifying the one or more roles assigned to the first and retrieving the permissions of such roles with respect to each of the fields displayable in an electronic document. As explained above, the permissions for the one or more roles may be identified by referencing the hierarchical permission context structure 402.

In FIG. 6, the transformation module 218 has determined that the first user 604 is authorized to view the field data of the "Patent Number" field. Thus, as shown in FIG. 6, and with reference to FIG. 5, the data value 608 from the "value" field 516 is displayed to the user 122 via the graphical user interface 602. However, as discussed below with regard to FIG. 7, depending on the permissions assigned to the one or more roles of the user 122, the data value 608 may not be displayed.

FIG. 7 illustrates another example graphical user interface 702, according to an example embodiment, for interacting with the application provided by the application server of FIG. 1. In FIG. 7, a third user 704 has accessed the application provided by the application module 214 and displayable by the user interface module 212. However, and with reference to FIG. 5, the third user 704 has different permissions than either the first user 604 or the second user 606. In particular, the third user 704 is not authorized (e.g., does not have the permissions) to view the data stored in the "value" field 516 of the record 522 corresponding to the "Patent Number" field. Accordingly, the transformation module 218 replaces the data of the "value" field 516 with a previously determined identifier that conveys to the third user 704 that he or she is not authorized to view the replaced data. However, the third user 704 is still made aware that data exists for the "Patent Number" field because such field is included in the dynamic generation of the electronic documents displayed by the user interface module 212. In this manner, unauthorized users are prevented from viewing restricted or classified fields but they are still made aware that such data exists. This allows the unauthorized users to seek out those who are authorized and to obtain the restricted data from them.

FIGS. 8A-8D illustrate a method 802, according to an example embodiment, for dynamic runtime field-level access control using the hierarchical permission context structure of FIG. 4. With reference to FIG. 2, the method 802 may be implemented by any one of the modules 208 and is described by way of reference thereto. Initially, the application server 112, via the user interface module 212 and/or the application module 214, receives a request to access a web application (Operation 804). In one embodiment, user credentials, such as a username and password, are provided with the request (Operation 806). Alternatively and/or additionally, the application module 214 may request that the user 122 provide such credentials before being granted access to the application provided by the application module 214. As discussed above, user credentials may also include biometric credentials, such as fingerprint data, retina data, voice data, or any other such biometric credentials now known or later developed.

With the received user credentials, the authentication module 216 then determines the one or more user roles associated with the user identified by the provided user credentials (Operation 808). As explained previously, and in one embodiment, the authentication module 216 queries the authentication database 122 to obtain the one or more user roles. Provided that the user is authenticated, the authentication module 216 then instructs the application module 214 to provide access to the web application hosted by, or provided by, the application server 112 (Operation 810). The application server 112 then waits for the client device 104 to provide a request for one or more electronic documents accessible via a web application (Operation 812).

Figure 8A:
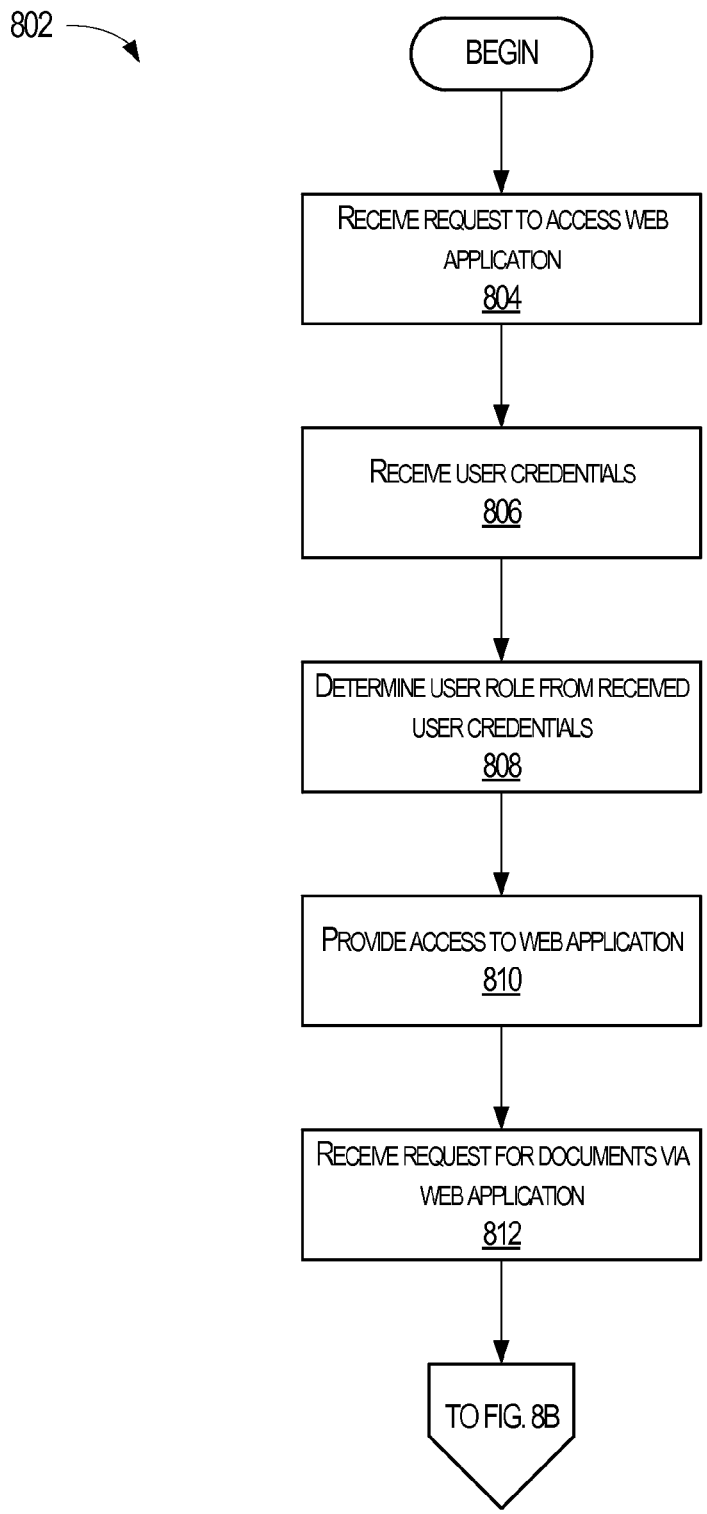
FIGS. 8A-8D illustrate a method, according to an example embodiment, for dynamic runtime field-level access control using the hierarchical permission context structure of FIG. 4.
Figure 8B:
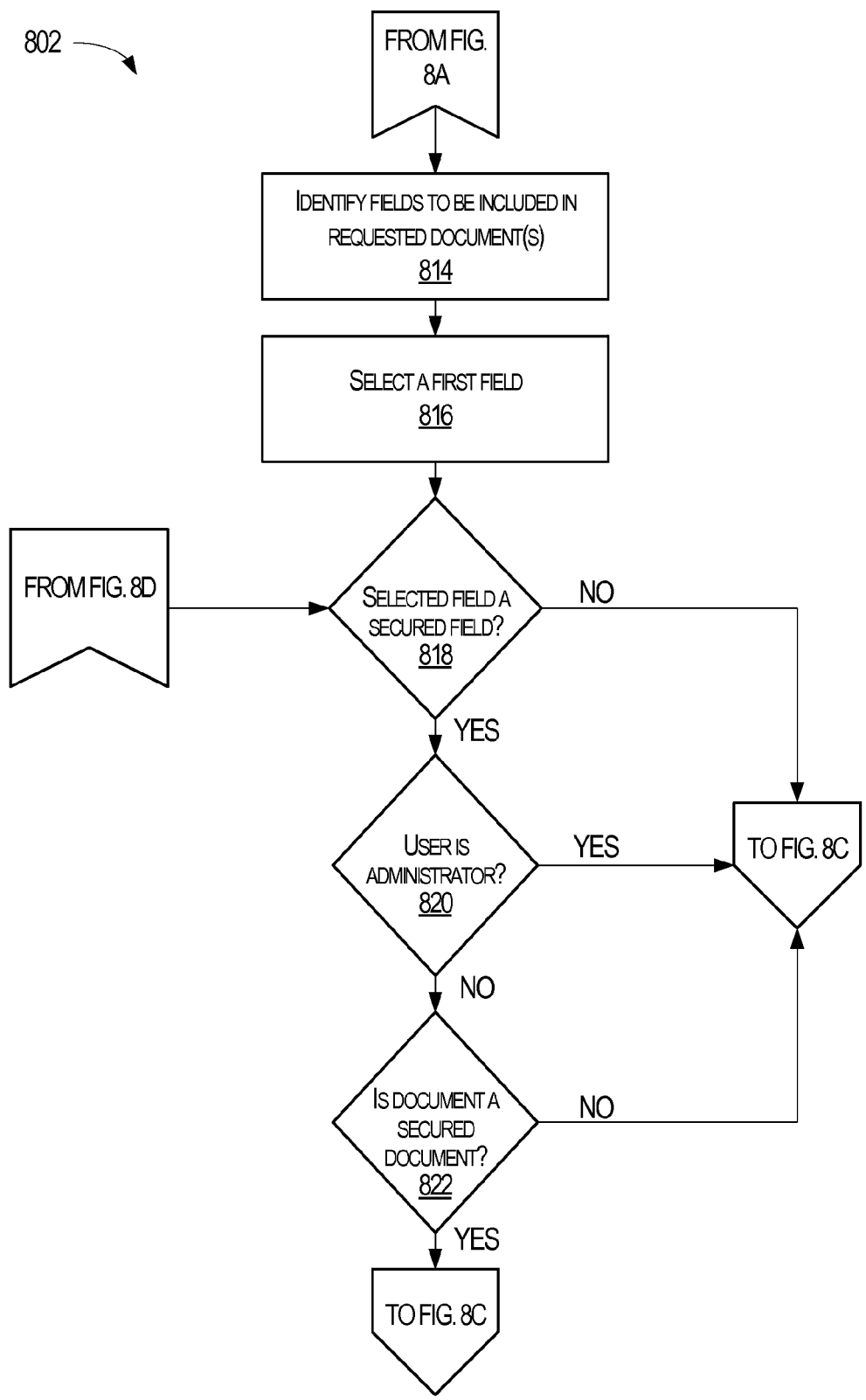

Referring next to FIG. 8B, the transformation module 218 and/or the application module 214 then determines the various data fields to be included in the requested one or more electronic documents (Operation 814). As explained above, the requested electronic documents may be generated dynamically via an interpreter module 220, which retrieves data from one or more "value" fields from corresponding records stored in the application database 118. The transformation module 218 may leverage the interpreter module 220 to identify those fields that are dynamically populated with the data in the generation of the one or more requested electronic documents.

In determining whether a user is authorized to view the data for a given field, the transformation module 218 may engage in one or more operations as described below. Initially, the transformation module 218 selects a first identified field (Operation 816). The transformation module 218 then queries the application database 118 to determine whether the first identified field is a secured field (Operation 818). In one embodiment, a secured field is a field where the Boolean value in the "publicviewable" field in the record corresponding to the first identified field is "FALSE." In this embodiment, and as one of ordinary skill in the art will recognize, an unsecured field is a field where the Boolean value in the "publicviewable" field is "TRUE." In this manner, where the first identified field is determined as being an unsecured field (e.g., "No" branch of Operation 818), the method 802 then proceeds to Operation 828, discussed further below. However, where the first identified field is determined as being a secured field (e.g., "Yes" branch of Operation 818), the method 802 then proceeds to Operation 820.

At Operation 820, the transformation module 218 determines whether the user is assigned one or more predetermined roles, such as an administrative role. This determination is performed because, if the field is a secured field, an administrator should be able to view the data of the secured field. In one embodiment, and as discussed above, the transformation module 218 determines the one or more roles assigned to the user by querying the authentication database 120, which returns the one or more roles assigned to the user. The authentication database 120 may return one or more node identifiers, which the transformation module 218 may cross reference with the hierarchical permission context structure 230 to determine the permissions assigned to the user.

If this if the user is determined not to be an administrator (e.g. "No" branch of Operation 820), then the method 802 proceeds to Operation 828. In contrast, if the user is determined to be an administrator (e.g. "Yes" branch of Operation 820), then the method 802 proceeds to Operation 822.

At Operation 822 the transformation module 212 determines whether the requested electronic document is a secured document (e.g., an electronic document that is not publicly viewable). In one embodiment, this determination is made by querying the application database 118 and retrieving metadata from a record corresponding to the requested electronic document. Similar to the records illustrated in FIG. 5, the record corresponding to the requested electronic document may also have similar fields. Thus, and in one embodiment, the record corresponding to the requested electronic document has a "publicviewable" field. The transformation module 212 then determines whether the Boolean value stored in the "publicviewable" field is "TRUE" or "FALSE." Where the Boolean value is "TRUE," the method 802 proceeds to Operation 828; where the Boolean value is "FALSE," the method 802 then proceeds to Operation 824.

Figure 8C:
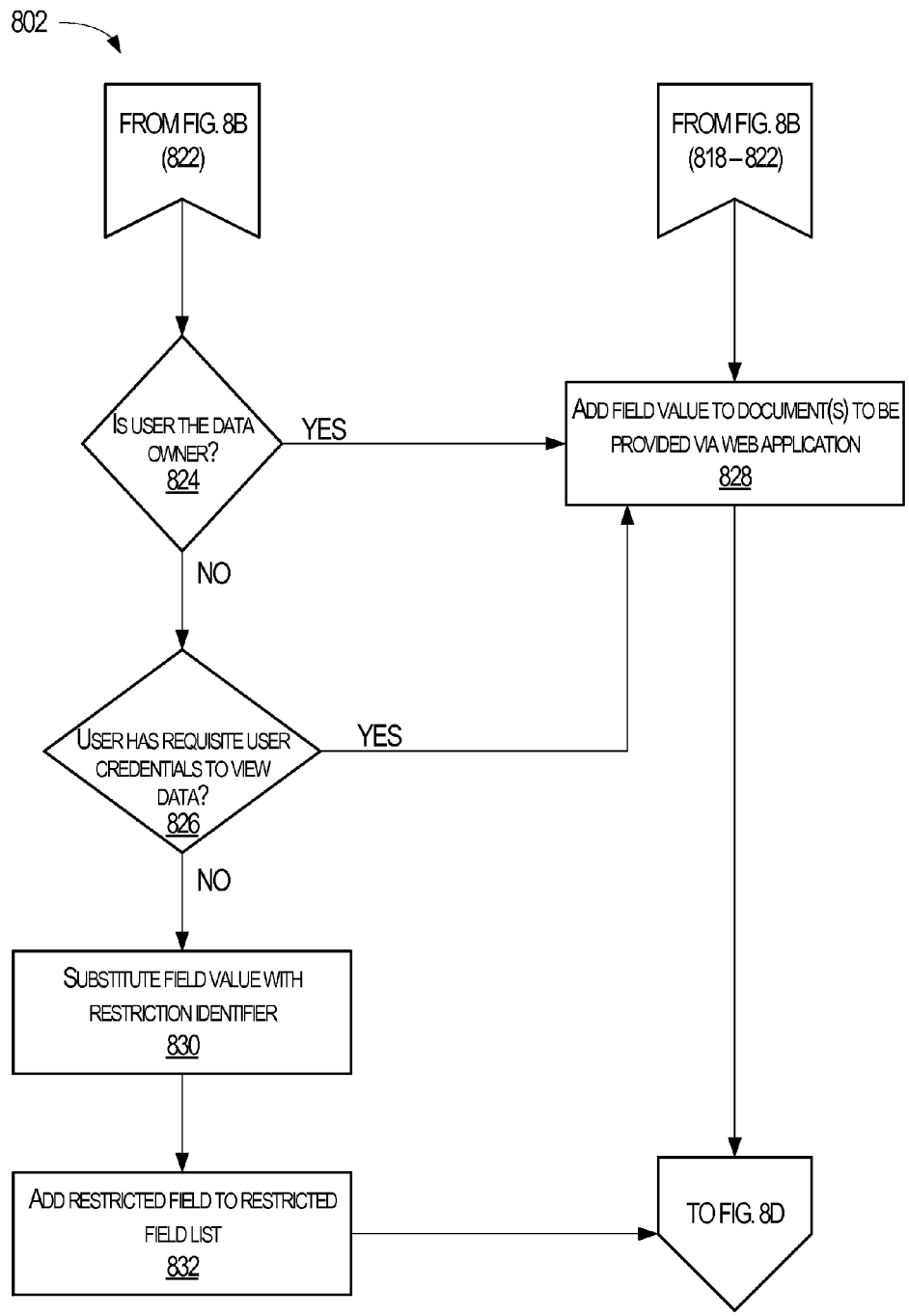

Referring to FIG. 8C, the transformation module 212 next determines whether the user requesting the electronic document is the owner of the data stored in the "value" field of the record corresponding to the field being analyzed (Operation 824). With reference to FIG. 5, and in one embodiment, this determination is made by referencing the "createdby" field 506 of the record corresponding to the field being analyzed. As the user accessing the web application may be assigned a user identifier, the transformation module 212 compares this user identifier with the user identifier listed in the "createdby" field 506. Where the transformation module 212 determines that the accessing user is the data owner (e.g., "Yes" branch of Operation 824), the method 802 proceeds to Operation 828. Alternatively, where the transformation module 212 determines that the accessing user is not the data owner (e.g., "No" branch of Operation 824), the method 802 proceeds to Operation 826.

At Operation 826, the transformation module 212 determines whether the accessing user is authorized to view the data of the field being analyzed. In this regard, the transformation module 212 may determine whether the one or more roles assigned to the user correspond to one or more roles assigned to the data owner (e.g., the user identified in the "createdby" field). Alternatively, the transformation module 212 may reference the hierarchical permission context structure 230 to determine whether the one or more roles assigned to the user has a permission to view the field being analyzed. In one embodiment, the permission is specific to the field being analyzed. In alternative embodiments, the permission corresponds to the type of field being analyzed. In further embodiments, the permission corresponds to the UUID assigned to the field being analyzed. In this way, a single permission may apply to multiple fields displayable within the requested one or more electronic documents (e.g., a one-to-many relationship between a permission and applicable fields).

Should any of the foregoing decisions be answered in the affirmative (e.g., the "Yes" branch of Operations 818-826), the method proceeds to Operation 828. At Operation 828, the transformation module 212 signals to the application module 214 that the data for the field being analyzed can be displayed in the requested electronic document. Accordingly, the application module 214 retrieves the data stored in the "value" field for the record corresponding to the field being analyzed. This data may then be communicated to the interpreter module 220, which dynamically generates the requested one or more electronic documents for display via the user interface module 212. The method 802 then proceeds to Operation 834 of FIG. 8D, which is discussed further below.

However, should the foregoing decisions each be answered in the negative, the method 802 proceeds to Operation 830. At Operation 830, the transformation module 212 communicates a predetermined restriction identifier to the application module 214 to be displayed instead of the data stored in the "value" field of the record corresponding to the field being analyzed. In addition, the transformation module 212 then adds the field being analyzed to a restricted field list (Operation 832), which is also communicated to the application module 214. Thus, when the requested electronic document is generated by the application module 214 and/or the interpreter module 220, the client device 104 displays an electronic document with the predetermined restriction identifier and, in some embodiments, a list of the restricted fields determined by the transformation module 212.

Figure 8D:
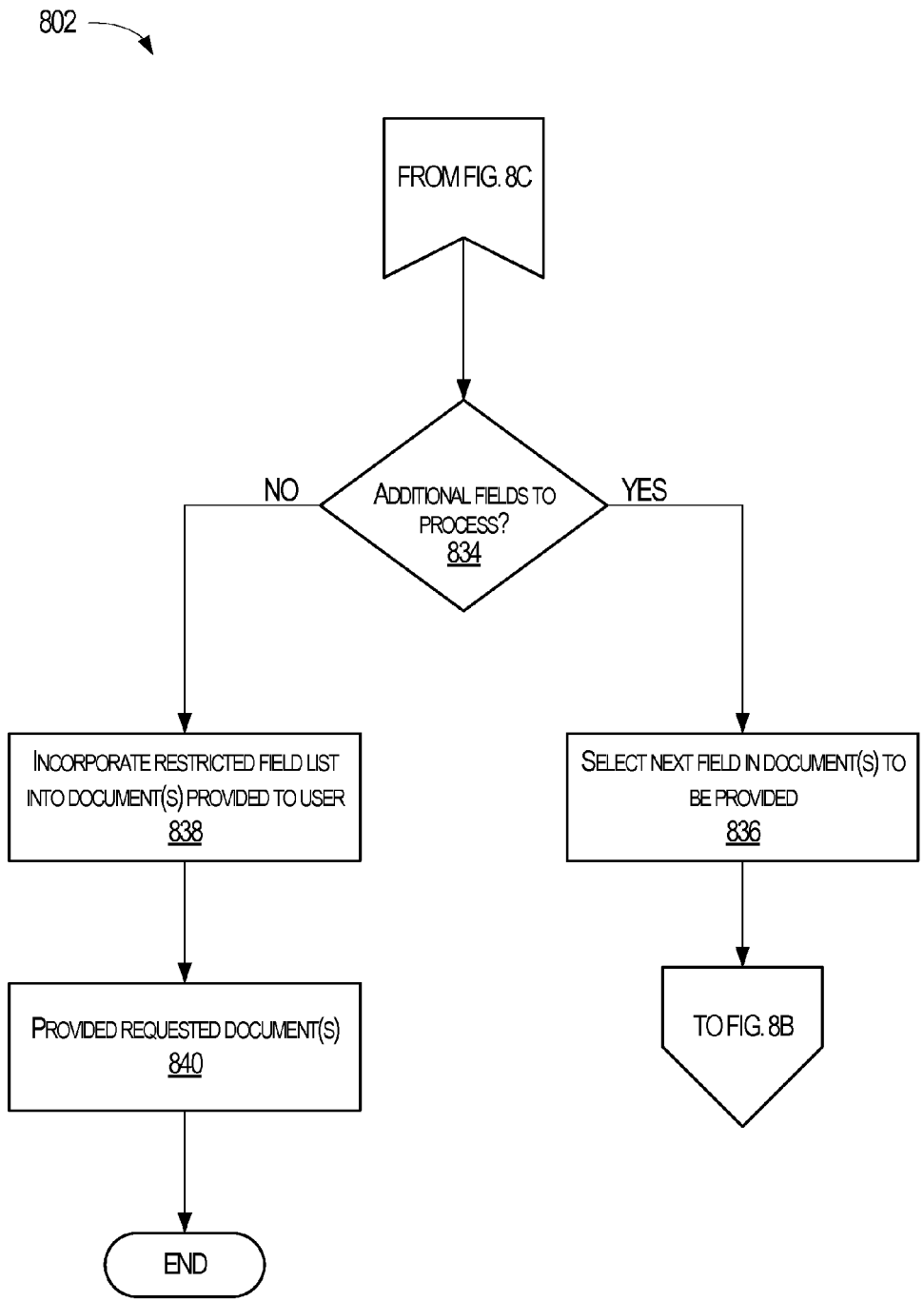

Referring next to FIG. 8D, the transformation module 212 then determines whether there are remaining fields to be analyzed in the requested one or more electronic documents (Operation 834). If this decision is determined in the affirmative (e.g., "Yes" branch of Operation 834), the transformation module 212 then selects the next field in the requested one or more electronic documents for analysis (Operation 836). The method 802 then returns to Operation 818 of FIG. 8B.

Alternatively, if there are no fields remaining to be analyzed (e.g., "No" branch of Operation 834), the transformation module 212 incorporates the restricted field list into the one or more electronic documents being provided to the client device 104 (Operation 838). As discussed above, the application module 214 and/or the interpreter module 220 then provides the requested one or more electronic documents to the client device 104 with the restricted field list (Operation 840).

In this way, the disclosed systems and methods provide a mechanism in which sensitive data is made available to authorized users, but also in which users who are not authorized are made aware that such data exists. The technical benefit of such systems is that the analysis is done at run-time through the dynamic generation of data and that separate electronic documents for individual users are not needed. Thus, different users having different sets of permissions may each view different sets of data for a given electronic document. Furthermore, as the disclosed systems and methods leverage a hierarchical context permission structure, individual users need not be assigned permissions for specific fields. Rather, such permissions are determined from the one or more roles assigned to a given user. Thus, a further technical benefit is that permission management of users is made simpler and far more easier to manage than if each user were assigned permissions for specific fields.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-8D are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Example Machine Architecture and Machine-Readable Medium

Figure 9:
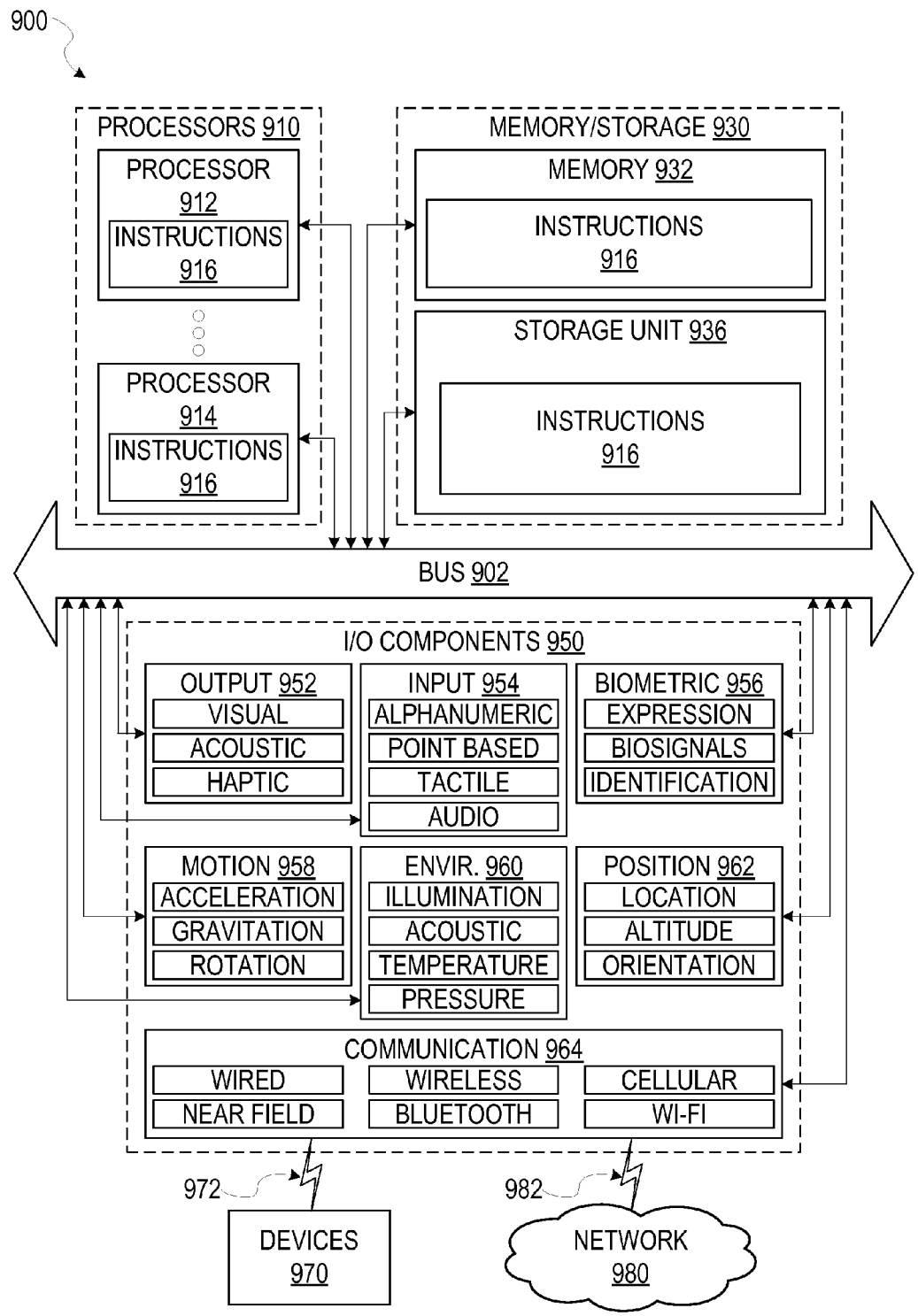
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions may cause the machine to execute the flow diagrams of FIGS. 8A-8D. Additionally, or alternatively, the instructions may implement one or more of the components of FIG. 2. The instructions transform the general, non-programmed machine into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a personal digital assistant (PDA), or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute instructions 916. The term "processor" is intended to include multi-core processor that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core process), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of processors 910 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.
Language Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system for dynamically determining field-level access control using a hierarchical permission context structure, the system comprising:
   a machine-readable medium storing computer-executable instructions; and
   at least one hardware processor communicatively coupled to the machine-readable medium that, when the computer-executable instructions are executed, the at least one hardware processor is configured to:
   receive one or more user credentials, the one or more user credentials corresponding to a user;
   identify a plurality of fields in an electronic document to be communicated to a client device;
   select a first field from the plurality of fields, the first field having a label portion and a data portion, wherein the selected first field is associated with a second user, the second user being different than the first user; and
   determine whether the one or more user credentials provide authorization for viewing data associated with the data portion of the selected first field by:
      referencing a hierarchical permission context structure, the hierarchical permission context structure defining a hierarchy of assignable user roles; and
      comparing one or more of the user roles assigned to the second user with one or more user roles assigned to the first user;
   in response to a determination that the received one or more user credentials do not provide authorization, replace the data of the data portion of the selected first field with a predetermined restriction identifier prior to communicating the electronic document to the client device, the predetermined restriction identifier informing the user that the user is not authorized to view the data;
   in response to a determination that the received one or more user credentials provide authorization, add the data to the data portion of the selected first field; and
   communicate the electronic document to the client device.

2. The system of claim 1, wherein the hierarchical permission context structure includes a plurality of nodes, each node being associated with a corresponding user role.

3. The system of claim 1, wherein the at least one hardware processor is further configured to:
   add the first field to a redacted field list, the redacted field list identifying at least one field from the plurality of fields where the user was not authorized to view the data associated with the data portion of the at least one field; and
   communicate the redacted field list to the client device.

4. The system of claim 1, wherein:
   at least one assignable user role selected from the assignable user roles is associated with a permission that specifies that the first user is authorized to view the data of the data portion associated with the selected first field; and
   the determination of whether the first user of the client device is authorized to view the data associated with the data portion is further performed by determining whether the first user has been assigned the at least one assignable user role.

5. The system of claim 1, wherein:
the electronic document is associated with a secured document identifier that specifies whether the electronic document is a secured electronic document; and
the determination of whether the user of the client device is authorized to view the data associated with the data portion is further performed by determining that secured document identifier specifies that the electronic document is a secured electronic document.

6. The system of claim 1, wherein:
a set of the plurality of fields are each associated with a label portion and a data portion; and
the at least one hardware processor is further configured to determine, for each field of the set of the plurality of fields, whether a user of the client device is authorized to view data associated with the data portion of a given field.

7. A method for dynamically determining field-level access control using a hierarchical permission context structure, the method comprising:
receiving, by at least one hardware processor, one or more user credentials, the one or more user credentials corresponding to a user;
identifying, by the at least one hardware processor, a plurality of fields in an electronic document to be communicated to a client device;
selecting, by the at least one hardware processor, a first field from the plurality of fields, the first field having a label portion and a data portion, wherein the selected first field is associated with a second user, the second user being different than the first user;
determining, by the at least one hardware processor, whether the one or more user credentials provide authorization for viewing data associated with the data portion of the selected first field by:
referencing a hierarchical permission context structure, the hierarchical permission context structure defining a hierarchy of assignable user roles; and
comparing one or more user roles assigned to the second user with one or more user roles assigned to the first user;
in response to a determination that the received one or more user credentials do not provide authorization, replacing, by the at least one hardware processor, the data of the data portion of the selected first field with a predetermined restriction identifier prior to communicating the electronic document to the client device, the predetermined restriction identifier informing the user that the user is not authorized to view the data;
in response to a determination that the received one or more user credentials provide authorization, adding, by the at least one hardware processor, the data to the data portion of the selected first field; and
communicating, by the at least one hardware processor, the electronic document to the client device.

8. The method of claim 7, wherein the hierarchical permission context structure includes a plurality of nodes, each node being associated with a corresponding user role.

9. The method of claim 7, further comprising:
adding the first field to a redacted field list, the redacted field list identifying at least one field from the plurality of fields where the user was not authorized to view the data associated with the data portion of the at least one field; and
communicating the redacted field list to the client device.

10. The method of claim 7, wherein:
at least one assignable user role selected from the assignable user roles is associated with a permission that specifies that the first user is authorized to view the data of the data portion associated with the selected first field; and
the determination of whether the first user of the client device is authorized to view the data associated with the data portion is further performed by determining whether the first user has been assigned the at least one assignable user role.

11. The method of claim 7, wherein:
the electronic document is associated with a secured document identifier that specifies whether the electronic document is a secured electronic document; and
the determination of whether the user of the client device is authorized to view the data associated with the data portion is further performed by determining that secured document identifier specifies that the electronic document is a secured electronic document.

12. The method of claim 7, wherein:
a set of the plurality of fields are each associated with a label portion and a data portion; and
the method further comprises determining, for each field of the set of the plurality of fields, whether a user of the client device is authorized to view data associated with the data portion of a given field.

13. A non-transitory, machine-readable medium having computer-executable instructions stored thereon that, when executed by at least one hardware processor, configure the at least one hardware processor to perform a plurality of operations for dynamically determining field-level access control using a hierarchical permission context structure, the operations comprising:
receiving one or more user credentials, the one or more user credentials corresponding to a user;
identifying a plurality of fields in an electronic document to be communicated to a client device;
selecting a first field from the plurality of fields, the first field having a label portion and a data portion, wherein the selected first field is associated with a second user, the second user being different than the first user; and
determining whether the one or more user credentials provide authorization for viewing data associated with the data portion of the selected first field by:
referencing a hierarchical permission context structure, the hierarchical permission context structure defining a hierarchy of assignable user roles; and
comparing one or more user roles assigned to the second user with one or more user roles assigned to the first user;
in response to a determination that the received one or more user credentials do not provide authorization, replacing the data portion of the selected first field with a predetermined restriction identifier prior to communicating the electronic document to the client device, the predetermined restriction identifier informing the user that the user is not authorized to view the data;
in response to a determination that the received one or more user credentials provide authorization, adding the data to the data portion of the selected first field; and
communicating the electronic document to the client device.

14. The non-transitory, machine-readable medium of claim 13, wherein the hierarchical permission context structure includes a plurality of nodes, each node being associated with a corresponding user role.

15. The non-transitory, machine-readable medium of claim 13, wherein plurality of operations further comprise:
    adding the first field to a redacted field list, the redacted field list identifying at least one field from the plurality of fields where the user was not authorized to view the data associated with the data portion of the at least one field; and
    communicating the redacted field list to the client device.

16. The non-transitory; machine-readable medium of claim 13, wherein:
    at least one assignable user role selected from the assignable user roles is associated with a permission that specifies that the first user is authorized to view the data of the data portion associated with the selected first field; and
    the determination of whether the first user of the client device is authorized to view the data associated with the data portion is further performed by determining whether the first user has been assigned the at least one assignable user role.

17. The non-transitory, machine-readable medium of claim 13, wherein:
    the electronic document is associated with a secured document identifier that specifies whether the electronic document is a secured electronic document; and
    the determination of whether the user of the client device is authorized to view the data associated with the data portion is further performed by determining that secured document identifier specifies that the electronic document is a secured electronic document.

\* \* \* \* \*

UNITED STATES PATENT AND TRADEMARK OFFICE
CERTIFICATE OF CORRECTION

PATENT NO. : 10,032,045 B2
APPLICATION NO. : 14/928585
DATED : July 24, 2018
INVENTOR(S) : Barrett et al.

Page 1 of 2

It is certified that error appears in the above-identified patent and that said Letters Patent is hereby corrected as shown below:

In the Specification

In Column 7, Line 27, delete "hierarchal" and insert --hierarchical-- therefor

In Column 9, Line 61, delete "122" and insert --120-- therefor

In Column 10, Line 4, delete "214" and insert --218-- therefor

In Column 13, Line 15, after "514" insert --.--

In Column 15, Line 10, delete "122" and insert --120-- therefor

In Column 16, Line 3, delete "212" and insert --218-- therefor

In Column 16, Line 15, delete "212" and insert --218-- therefor

In Column 16, Line 21, delete "212" and insert --218-- therefor

In Column 16, Line 29, delete "212" and insert --218-- therefor

In Column 16, Line 32, delete "212" and insert --218-- therefor

In Column 16, Line 35, delete "212" and insert --218-- therefor

In Column 16, Line 38, delete "212" and insert --218-- therefor

In Column 16, Line 41, delete "212" and insert --218-- therefor

In Column 16, Line 45, delete "212" and insert --218-- therefor

Signed and Sealed this
Nineteenth Day of January, 2021

Andrei Iancu
*Director of the United States Patent and Trademark Office*

CERTIFICATE OF CORRECTION (continued)
U.S. Pat. No. 10,032,045 B2

In Column 16, Line 60, delete "212" and insert --218-- therefor

In Column 17, Line 7, delete "212" and insert --218-- therefor

In Column 17, Line 11, delete "212" and insert --218-- therefor

In Column 17, Line 19, delete "212" and insert --218-- therefor

In Column 17, Line 20, delete "212" and insert --218-- therefor

In Column 17, Line 25, delete "212" and insert --218-- therefor

In Column 17, Line 31, delete "212" and insert --218-- therefor

In the Claims

In Column 25, Line 45, in Claim 7, delete "authorization;" and insert --authorization,-- therefor In Column 25, Line 53, in Claim 7, delete "authorization; adding;" and insert --authorization, adding,-- therefor In Column 26, Line 25, in Claim 12, delete "determining;" and insert --determining,-- therefor In Column 26, Line 29, in Claim 13, delete "non-transitory;" and insert --non-transitory,-- therefor In Column 26, Line 37, in Claim 13, delete "credentials;" and insert --credentials,-- therefor In Column 27, Line 11, in Claim 16, delete "non-transitory;" and insert --non-transitory,-- therefor